US012695828B2

(12) United States Patent
Wendt et al.

(10) Patent No.: US 12,695,828 B2
(45) Date of Patent: Jul. 28, 2026

(54) MOBILE ELECTRONIC DEVICE INPUT ACTUATION

(71) Applicant: Microsoft Technology Licensing, LLC, Redmond, WA (US)

(72) Inventors: Nicholas Benjamin Wendt, Seattle, WA (US); Brett Andrew Tomky, Seattle, WA (US); Raveena Patil, Redmond, WA (US); Bianca Sullivan, Redmond, WA (US); Denys V Yaremenko, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 425 days.

(21) Appl. No.: 18/525,469

(22) Filed: Nov. 30, 2023

(65) Prior Publication Data

US 2025/0184425 A1     Jun. 5, 2025

(51) Int. Cl.
| | |
|---|---|
| *H04M 1/72463* | (2021.01) |
| *H04M 1/02* | (2006.01) |
| *H04M 1/72466* | (2021.01) |

(52) U.S. Cl.
CPC ... H04M 1/724631 (2022.02); H04M 1/0249 (2013.01); H04M 1/72466 (2021.01); *H04M 1/0279* (2013.01); *H04M 2250/22* (2013.01)

(58) Field of Classification Search
CPC ....... H04M 1/72466; H04M 1/724631; H04M 1/0249; H04M 2250/22; H04M 1/0279; H04M 1/0206; H04M 1/0235; H04M 1/0241
See application file for complete search history.

(56) References Cited

U.S. PATENT DOCUMENTS

| | | | |
|---|---|---|---|
| 9,578,154 B2 * | 2/2017 | Ahonen | H04M 1/66 |
| 2009/0008234 A1 | 1/2009 | Tolbert et al. | |
| 2011/0270219 A1 | 11/2011 | Friedli | |
| 2014/0240150 A1 | 8/2014 | Filson et al. | |
| 2021/0255711 A1 | 8/2021 | Wang | |
| 2022/0011905 A1 | 1/2022 | Li et al. | |

FOREIGN PATENT DOCUMENTS

| | | | | |
|---|---|---|---|---|
| CN | 115599244 B | 7/2023 | | |
| EP | 2323354 A1 * | 5/2011 | | H04M 1/23 |
| KR | 102139110 B1 | 7/2020 | | |

OTHER PUBLICATIONS

Machine translation of CN115599244 (Year: 2023).*

* cited by examiner

*Primary Examiner* — Rafael Pérez-Gutiérrez
*Assistant Examiner* — Alexander Wu
(74) *Attorney, Agent, or Firm* — Alleman Hall LLP

(57)     ABSTRACT

Examples are disclosed relating to mobile electronic devices and methods for preventing and allowing actuation of an input mechanism in the device. In one example, signals from a device sensor are used to determine that a user's hand is not proximate to the device. Based at least on this determination, a moveable blocking member is moved to a blocking position that prevents actuation of the input mechanism. Subsequently, signals from the sensor are used to determine that a user's hand is proximate to the device. Based at least on this determination, the moveable blocking member is moved to an open position that allows actuation of the input mechanism.

20 Claims, 8 Drawing Sheets

MOBILE ELECTRONIC DEVICE INPUT ACTUATION

BACKGROUND

Mobile electronic devices can be utilized for a variety of tasks. In some use cases one or more buttons, switches, or other input mechanisms of a device can be helpful, and in other use cases those component(s) may not be needed.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to mobile electronic devices and methods for preventing and allowing actuation of an input mechanism in a mobile electronic device. In one example, a mobile electronic device comprises a chassis configured to be held by a user and defining a first aperture. A moveable blocking member is associated with the chassis and at least partially surrounding an input mechanism configured to be actuated by movement of an input component. An actuator is coupled to the moveable blocking member and a cover is affixed to the chassis and extends over the moveable blocking member. A sensor is configured to detect at least a user's hand proximate to the cover.

The device includes a processor and a memory storing instructions executable by the processor to use signals at least from the sensor to determine that a user's hand is proximate to the cover. Based at least on determining that the user's hand is proximate to the cover, the actuator is activated to move the moveable blocking member from a blocking position that prevents movement of the input component to an open position that allows movement of the input component and actuation of the input mechanism.

In another example, a method for preventing and allowing actuation of an input mechanism in a mobile electronic device is provided. The mobile electronic device comprises a sensor and moveable blocking member associated with a chassis and at least partially surrounding an input mechanism configured to be actuated by movement of an input component. The method comprises using signals at least from the sensor to determine that a user's hand is not proximate to the mobile electronic device. Based at least on determining that the user's hand is not proximate to the mobile electronic device, the moveable blocking member is moved to a blocking position that prevents movement of the input component. Signals at least from the sensor are used to determine that a user's hand is proximate to the mobile electronic device. And based at least on determining that the user's hand is proximate to the mobile electronic device, the moveable blocking member is moved to an open position that allows movement of the input component and actuation of the input mechanism.

DETAILED DESCRIPTION

Mobile electronic devices can be utilized for a variety of tasks. In some use cases one or more input mechanisms on the device can be helpful in conducting a desired task. For example, a button that mutes a microphone of a mobile phone may be useful when a person is conducting an audio or video call. However, in other use cases those component(s) may not be needed or could possibly interfere with a desired task.

Accordingly, examples are disclosed that relate mobile electronic devices configured to utilize signals from a sensor to selectively prevent and allow actuation of an input mechanism in the device. In one example and as described in more detail below, a moveable blocking member is associated with the device chassis and at least partially surrounds the input mechanism. A cover is affixed to the chassis and extends over the moveable blocking member. A sensor is configured to detect at least a user's hand proximate to the cover.

Using signals at least from the sensor, the device determines that a user's hand is not proximate to the cover. Based at least on determining that the user's hand is not proximate to the cover, the moveable blocking member is moved to a blocking position that prevents movement of an input component and actuation of the input mechanism. At another time and using signals at least from the sensor, the device determines that a user's hand is proximate to the cover. Based at least on determining that the user's hand is proximate to the cover, the moveable blocking member is moved from the blocking position to an open position that allows movement of the input component and actuation of the input mechanism. Advantageously, by controlling the accessibility of the input mechanism based at least in part on the proximity of a user's hand to the cover, the device makes actuation of the input mechanism available in use cases where the user's hand is holding the device or is otherwise proximate to the device, and corresponding prevents actuation of the input mechanism in use cases when the user's hand is not proximate to the device.

Figure 1:
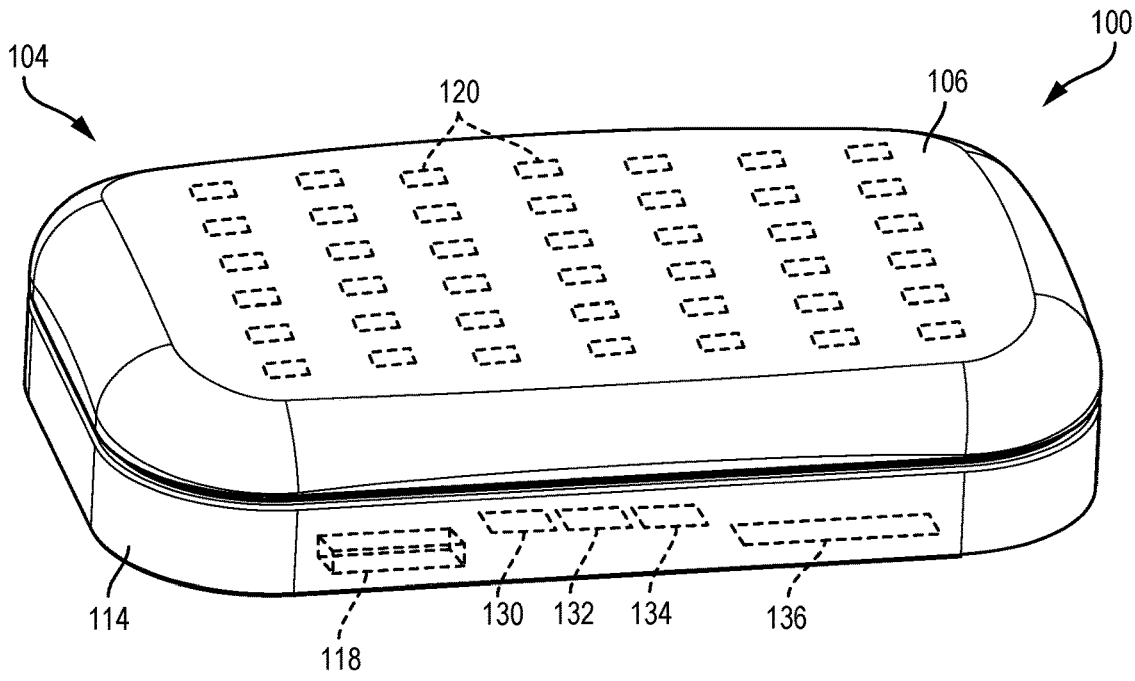
FIG. 1 shows a mobile electronic device according to examples of the present disclosure.
Figure 2:
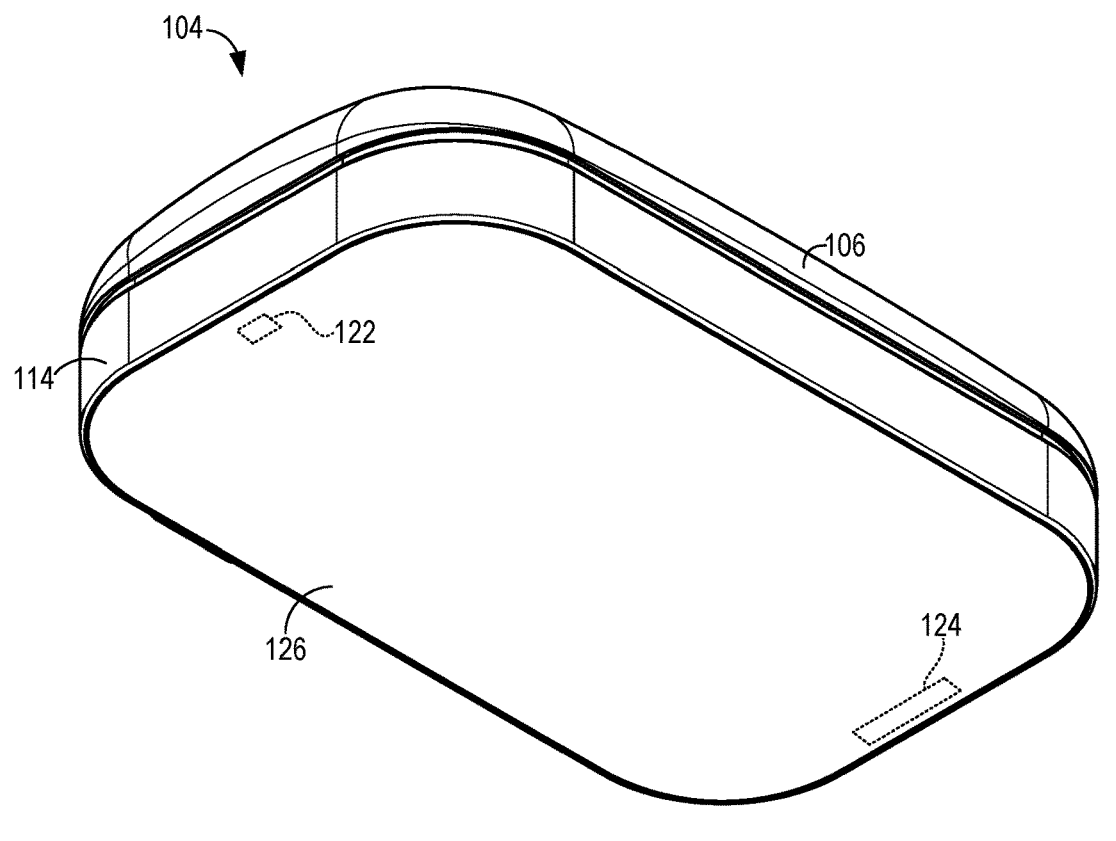
FIG. 2 shows another view of the mobile electronic device of FIG. 1.

With reference now to FIGS. 1 and 2, one example of a mobile electronic device 100 according to examples of the present disclosure is depicted. In this example mobile electronic device 100 comprises a chassis 104 configured to be held by a user and a flexible cover 106 affixed to the chassis. As described in more detail below, the flexible cover 106 extends over a moveable blocking member to provide a pleasing, uniform appearance to the device, and to allow movement of an internal stiffener plate and actuation of an input mechanism when the blocking member is in an open position. In this example and with reference also to FIG. 3, the chassis 104 comprises a first frame 110 that overlies a second frame 114, with the flexible cover 106 extending over and affixed to the second frame. In other examples, the chassis may be a single frame or may comprise three or more sub frames. The flexible cover can be fabricated from a variety of flexible materials, such as one or more e-textiles that are integrated with one or more sensors. Example materials for the cover can include cotton, polyester, nylon, Kevlar, and graphene-impregnated fabrics.

With reference again to FIG. 1, in some examples mobile electronic device 100 includes a sensor subsystem 118, schematically illustrated in FIG. 1, that includes one or more sensing components and functionalities, such as touch sensor(s), accelerometer(s), gyroscope(s), magnetometer(s), inertial measurement unit(s), force (pressure) sensor(s), and/or strain gauge(s). In the present example and as described further below, sensor subsystem 118 comprises touch sensing functionality that includes capacitive touch sensors 120 that are distributed within cover 106 as schematically depicted in FIG. 1. As described in more detail below, by detecting whether a user's hand is proximate to the cover, the moveable blocking member is controlled to either allow or prevent actuation of an internal switch.

The capacitive touch sensors 120 can utilize mutual capacitance to detect that a user's hand (such as one or more fingers, a palm, or other portion of a user's hand or limb) is proximate to (near or contacting) the cover 106. In these examples touch inputs are identified by sampling capacitance between a driving electrode and a sensing electrode in cover 106.

Driving electrodes are arranged in an array and touch detection signals are provided to each of the electrodes at a different frequency and/or at a different time. Conductive materials, such as a user's hand or finger, draw current away from the driving electrodes when providing a touch input. The touch input can be identified by detecting this current, and a location of the touch input can be reconstructed based at least in part on determining which driving electrodes were being driven when the touch input occurred, and the frequency of the touch detection signal driving each driving electrode. In other examples, mobile electronic devices employing other touch detection technologies, including but not limited to differential capacitance, self-capacitance, and projected capacitance touch detection, can be utilized.

With reference to FIG. 2, in this example the mobile electronic device 100 comprises a microphone 122, speaker 124 and display 126. In some use cases, the mobile electronic device 100 can be utilized as a mobile phone. Example hardware, including processor 130, memory 132, and communication subsystem 134 that may be incorporated by the mobile electronic device 100 is described further below with reference to FIG. 11. Mobile electronic device 100 further includes one or more power sources, such as battery 136, configured to provide power to processor 130 and to the various components of the device.

It will be appreciated that the mobile electronic device described above is merely an example, and that a wide variety of mobile electronic devices having different components and/or form factors can utilize the configurations and related principles of the present disclosure for selectively controlling access to an input mechanism as described herein.

As noted above, mobile electronic devices can be utilized for a variety of tasks. To perform some tasks a user can utilize one or more of the device's input mechanisms, such as one or more buttons, toggles, switches, or other components of a device. In other use cases one or more of those same component(s) may not be needed or could possibly interfere with a desired task. Accordingly, as described in more detail below and in one potential advantage of the present disclosure, mobile electronic devices of the present disclosure include a moveable blocking member that at least partially surrounds an input mechanism configured to be actuated by movement of an input component. Advantageously, using signals from a device sensor to determine whether a user's hand is proximate to the device cover, the moveable blocking member is selectively controlled to either allow or prevent actuation of the internal switch.

Figure 3:
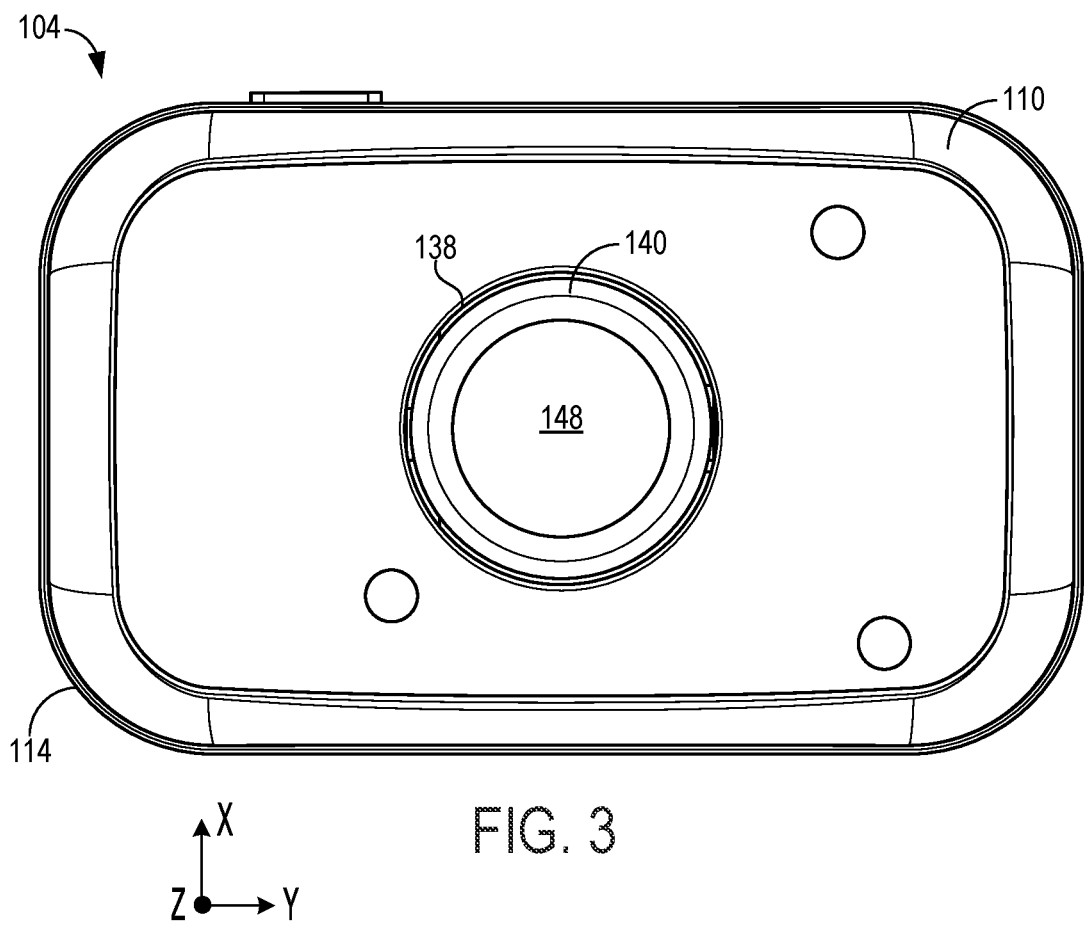
FIG. 3 shows a top view of the mobile electronic device with the cover removed and the moveable blocking member in a blocking position according to examples of the present disclosure.
Figure 4:
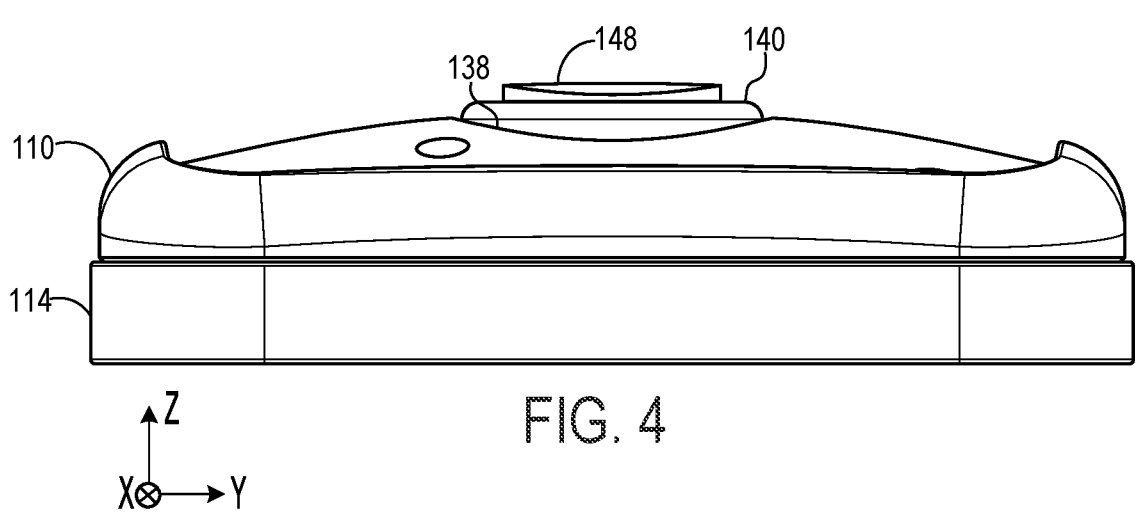
FIG. 4 shows a side view of the mobile electronic device of FIG. 3.
Figure 5:
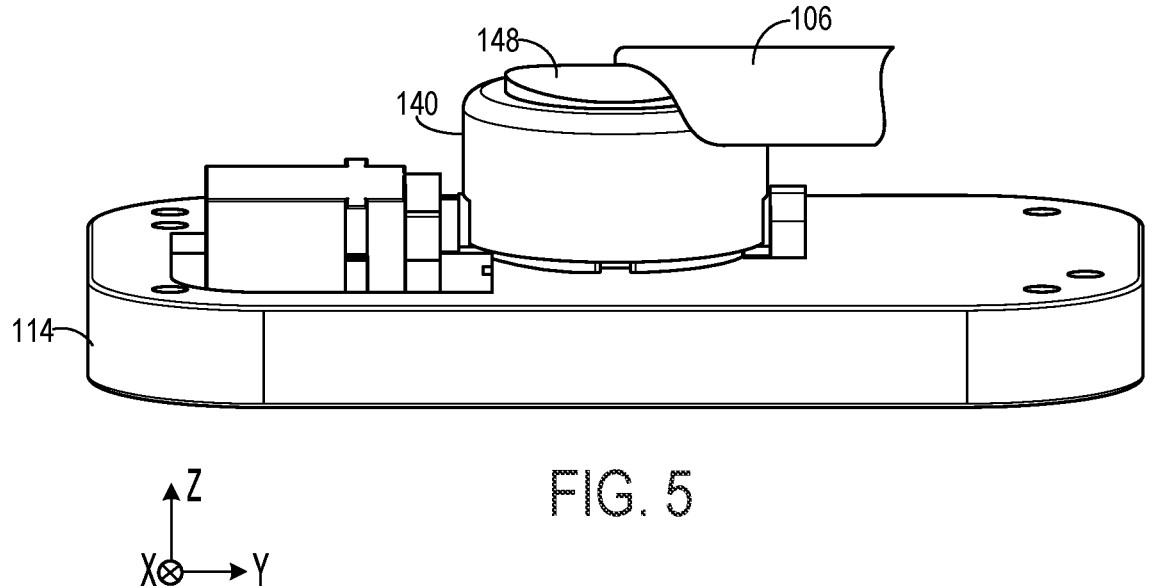
FIG. 5 shows the mobile electronic device of FIG. 3 with a first frame of the chassis removed and showing a cutaway portion of the cover.

With reference now to FIGS. 3-9, additional components of one example of mobile electronic device 100 are illustrated. As noted above, in this example mobile electronic device 100 includes a chassis 104 comprising a first frame 110 affixed to a second frame 114. With reference to FIGS. 3 and 4, the first frame 110 defines a first aperture 138 having a diameter that is larger than the diameter of moveable blocking member 140. In this example and with reference also to FIG. 6, moveable blocking member 140 comprises a cylinder that defines a second aperture 144. As shown in FIGS. 3 and 4, a portion of the moveable blocking member 140 extends through the first aperture 138 when the moveable blocking member is in a blocking position as depicted in FIGS. 3-5, 7, and 8. As described in more detail below, when the moveable blocking member is in the blocking position, the moveable blocking member prevents movement of an input component to correspondingly prevent actuation of an input mechanism of the input component.

Figure 6:
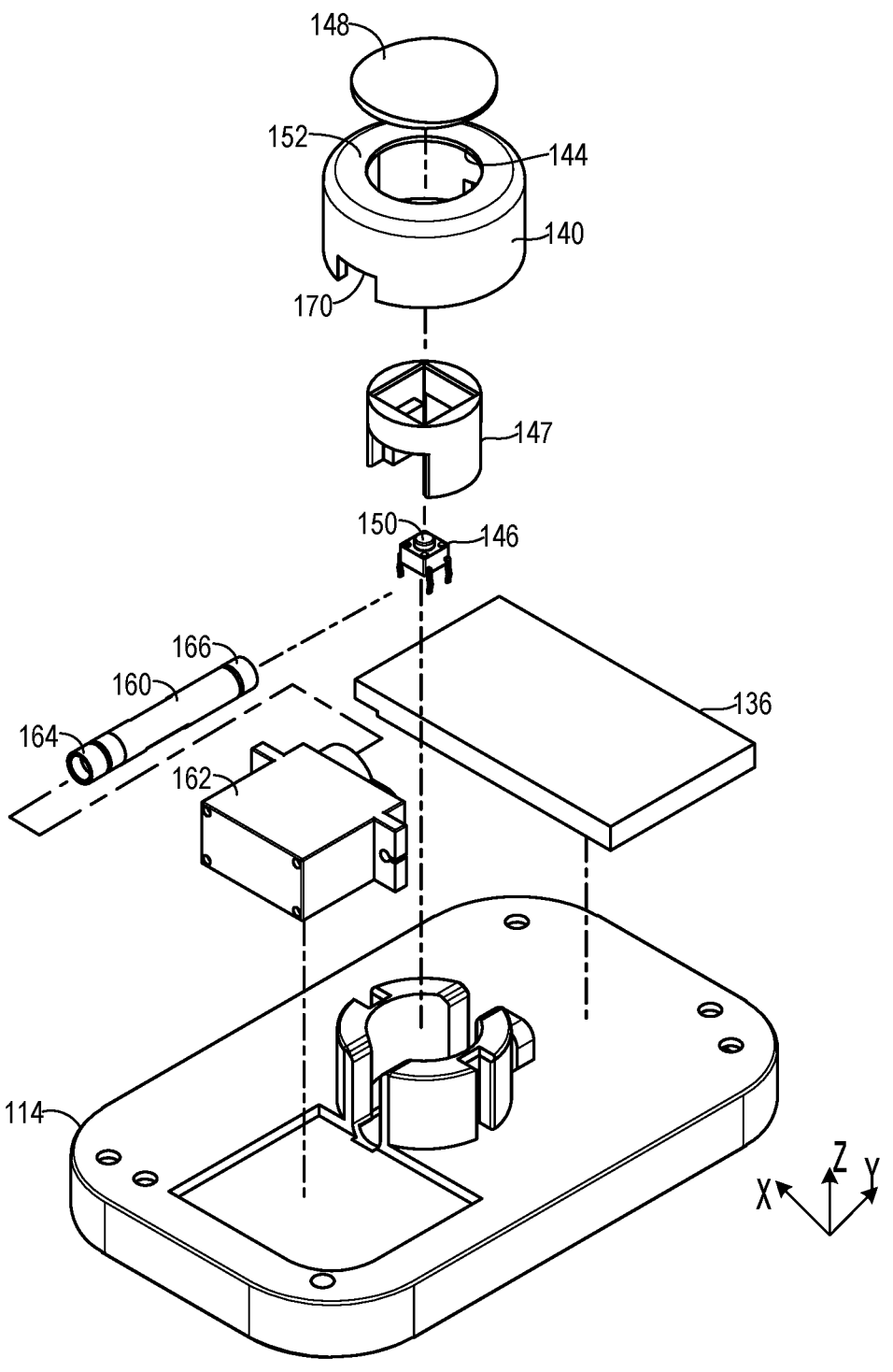
FIG. 6 shows an exploded view of selected components of the mobile electronic device of FIG. 5.
Figure 7:
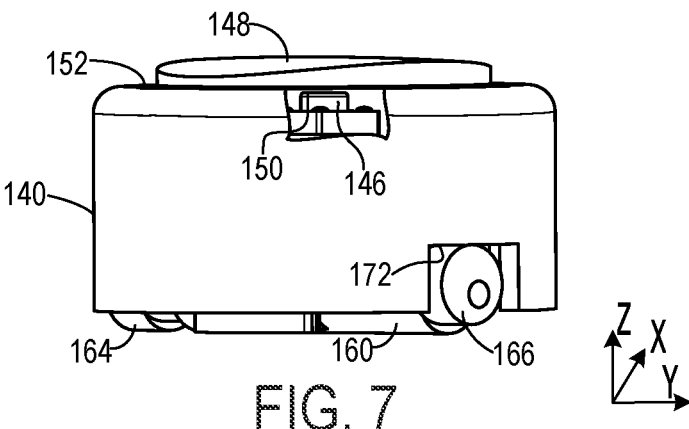
FIG. 7 shows the moveable blocking member in the blocking position with a partial cutaway revealing a portion of the input mechanism surrounded by the moveable blocking member.
Figure 8:
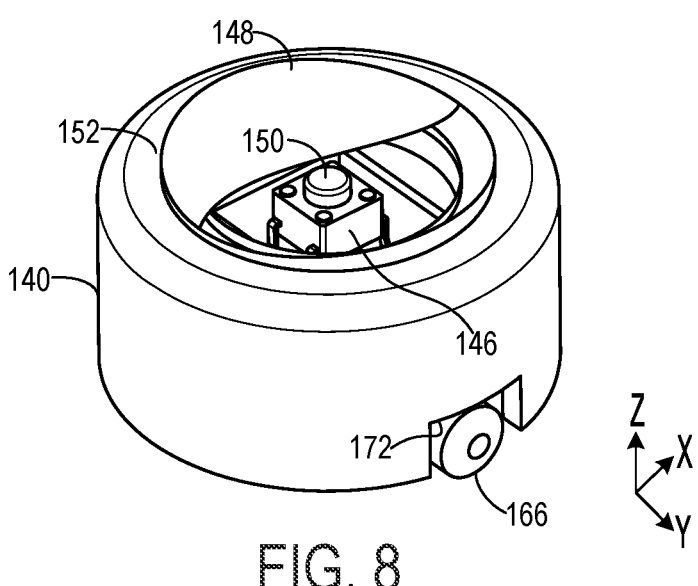
FIG. 8 shows another view of the moveable blocking member of FIG. 7 and the stiffener plate with a partial cutaway revealing a portion of the input mechanism.

With reference to FIGS. 6-8, inside moveable blocking member 140 is an input mechanism in the form of a switch 146 mounted within a housing 147 and configured to be actuated by movement of the switch. In the present example and with reference also to FIG. 5, an input component comprising a stiffener plate 148 is positioned over the second aperture 144 in moveable blocking member 140. In this example, the stiffener plate 148 is affixed to an interior surface of the cover 106. In this manner, the stiffener plate 148 is maintained in position over the moveable blocking member 140 and switch 146.

As described further below, and in one potential advantage of the present disclosure, when the moveable blocking member 140 is moved to the open position depicted in FIG. 9, a user can press and move the stiffener plate 148 downwardly in the negative z-axis direction to contact and depress the contacting surface 150 of the switch 146. In different examples, the user's movement of the stiffener plate 148 can occur after the moveable blocking member 140 has completed its movement to the open position, or in some cases the movement of the moveable blocking member 140 to the open position and a user's movement of the stiffener plate 148 can occur at the same time. Additionally, when the moveable blocking member 140 is in the blocking position depicted in FIGS. 3-5, 7, and 8, movement of the stiffener plate 148 is blocked by contact between the stiffener plate and the upper surface 152 of the moveable blocking member 140, thereby preventing movement of the stiffener plate to actuate the switch 146.

As described in more detail below, the moveable blocking member 140 at least partially surrounds the switch 146 and is moveable in the z-axis direction with respect to the switch between the blocking position as depicted in FIGS. 3-5, 7, and 8 and the open position depicted in FIG. 9. With reference to FIGS. 6-8, when the moveable blocking member 140 is in the blocking position, the upper surface 152 of the moveable blocking member is located above the contacting surface 150 of the switch 146. Additionally, the diameter of the stiffener plate 148 is larger than the diameter of the second aperture 144 in moveable blocking member 140. Accordingly, when the moveable blocking member 140 is in the blocking position, the stiffener plate 148 is at least partially overlapping the upper surface 152 of the moveable blocking member. Further and with reference to FIGS. 4, 5, and 7, in this position the stiffener plate 148 is immediately adjacent to the upper surface 152 of the moveable blocking member, either contacting the upper surface or slightly spaced from the surface. Accordingly, and in one potential advantage of this configuration, the overlapping of the stiffener plate 148 with the upper surface 152 of the moveable blocking member 140 prevents movement of the stiffener plate in the negative z-axis direction, thereby also preventing actuation of the switch 146.

Figure 9:
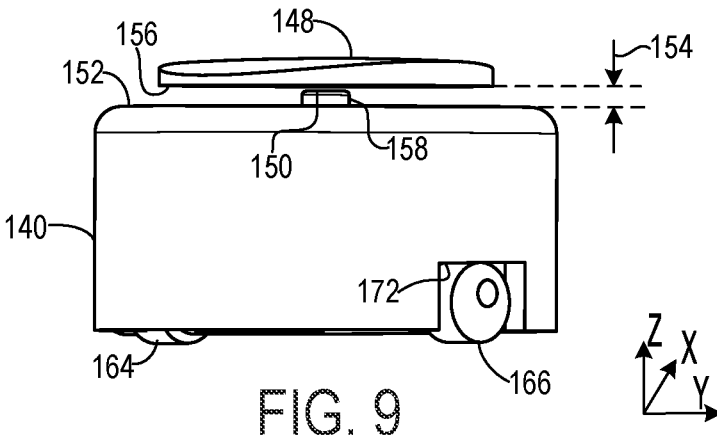
FIG. 9 shows a side view of the moveable blocking member in the open position that allows movement of the input component and actuation of the input mechanism.

With reference now to FIG. 9, when the moveable blocking member 140 is moved in the negative z-axis direction to the open position, the upper surface 152 of the moveable blocking member is moved below the contacting surface 150 of the switch 146. As shown in FIG. 9, the contacting surface 150 and at least a portion of the plunger 158 of switch 146 extend through the second aperture 144 of the moveable blocking member 140 when the moveable blocking member is in this open position. In this position a gap 154 is established between the upper surface 152 of the moveable blocking member 140 and the lower surface 156 of the stiffener plate 148. Advantageously, in this position the stiffener plate 148 is free to travel in the negative z-axis direction, thereby enabling a user to press the stiffener plate to contact and actuate the switch 146.

With reference again to FIGS. 6-9, in this example the actuator of the mobile electronic device 100 comprises a motor 162 and a mechanical linkage comprising a cam/follower arrangement to move the moveable blocking member 140 between the blocking position and the open position. Motor 162 is selectively activated to rotate a shaft 160 extending from the motor. On each end of the shaft 160 are cylindrical cams 164 and 166 that each contact corresponding follower surfaces 170 and 172, respectively, on the moveable blocking member 140. The center of rotation of each of the cylindrical cams 164 and 166 is offset from the center of rotation of the shaft 160. Accordingly, rotation of shaft 160 causes translation of the cylindrical cams 164 and 166 in the z-axis direction and corresponding translation of the moveable blocking member 140 in the z-axis direction via its follower surfaces 170 and 172.

As shown in FIGS. 7 and 8, in this first rotational position of shaft 160 the cylindrical cams 164 and 166 are in a raised position that locates the moveable blocking member 140 in the closed position. As noted above, based at least on determining that the user's hand is proximate to the cover 106, the motor 162 is activated to rotate the shaft 160 and cylindrical cams 164 and 166 in a counter-clockwise direction (as viewed along the y-axis in FIG. 7) to correspondingly move the moveable blocking member 140 from the blocking position to the open position as shown in FIG. 9. Subsequently when the system determines that the user's hand is not proximate to the cover, the motor 162 is activated to rotate the shaft 160 and cylindrical cams 164 and 166 in a clockwise direction to correspondingly move the moveable blocking member 140 from the open position back to the blocking position as shown in FIGS. 7 and 8.

It will be appreciated that in other examples of mobile electronic devices of the present disclosure, a variety of other actuators and corresponding configurations and mechanisms can be coupled to a moveable blocking member to selectively move the moveable blocking member between open and closed positions as described herein.

As noted above, in the present example the sensor subsystem 118 of the mobile electronic device 100 comprises touch sensing functionality that includes capacitive touch sensors distributed within cover 106. Signals from the touch sensors are used to determine whether a user's hand is proximate to the cover 106. In some examples, based at least on determining that the user's hand is not proximate to the cover 106, the moveable blocking member 140 is moved to the blocking position that prevents movement of the stiffener plate 148. For example, where the mobile electronic device 100 is resting display-side down on a surface, it may be desirable to prevent actuation of the switch 146 to avoid unintended or inadvertent user inputs. Accordingly, when the mobile electronic device 100 is resting display-side down and a user's hand is not proximate to the cover, the moveable blocking member 140 is moved to the blocking position to prevent movement of the stiffener plate 148.

Subsequently and in one use case example, a user places their hand on cover 106 and grasps the chassis 104 to pick up the mobile electronic device to make a phone call. Signals from the touch sensors are used to determine that a user's hand is now proximate to cover 106. In this situation, it is desirable to enable the user to actuate the switch 146 through the cover 106 to control one or more features of the device, such as conveniently activating a mute function on a phone call. Based at least on determining that the user's hand is proximate to the cover 106, the moveable blocking member 140 is moved to the open position that allows movement of the stiffener plate 148 and actuation of the switch 146. Advantageously, this additional functionality is selectively activated for this use case.

Figure 10A:
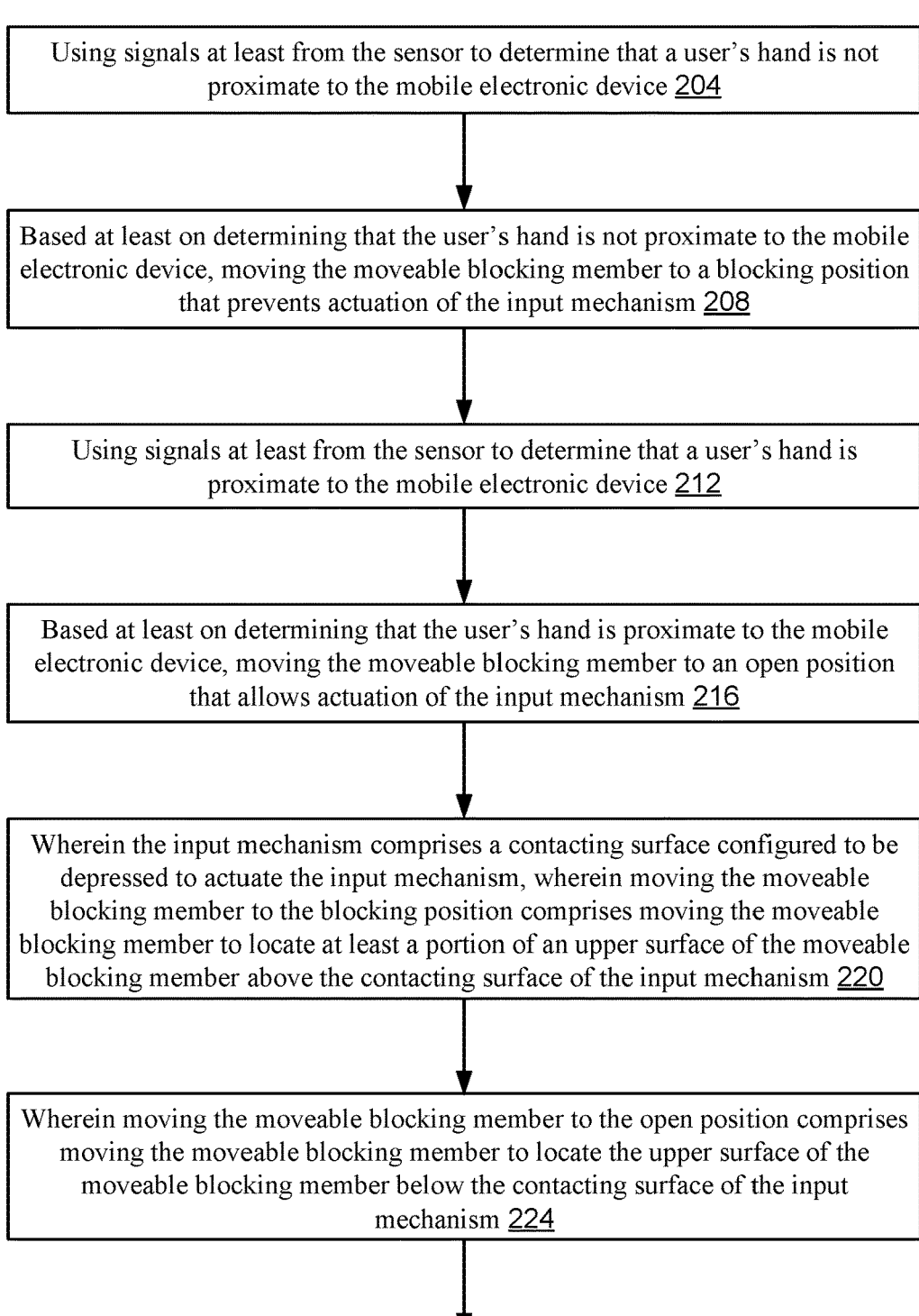
FIGS. 10A-10B show a flowchart illustrating a method for preventing and allowing actuation of an input mechanism in a mobile electronic device according to examples of the present disclosure.
Figure 10B:
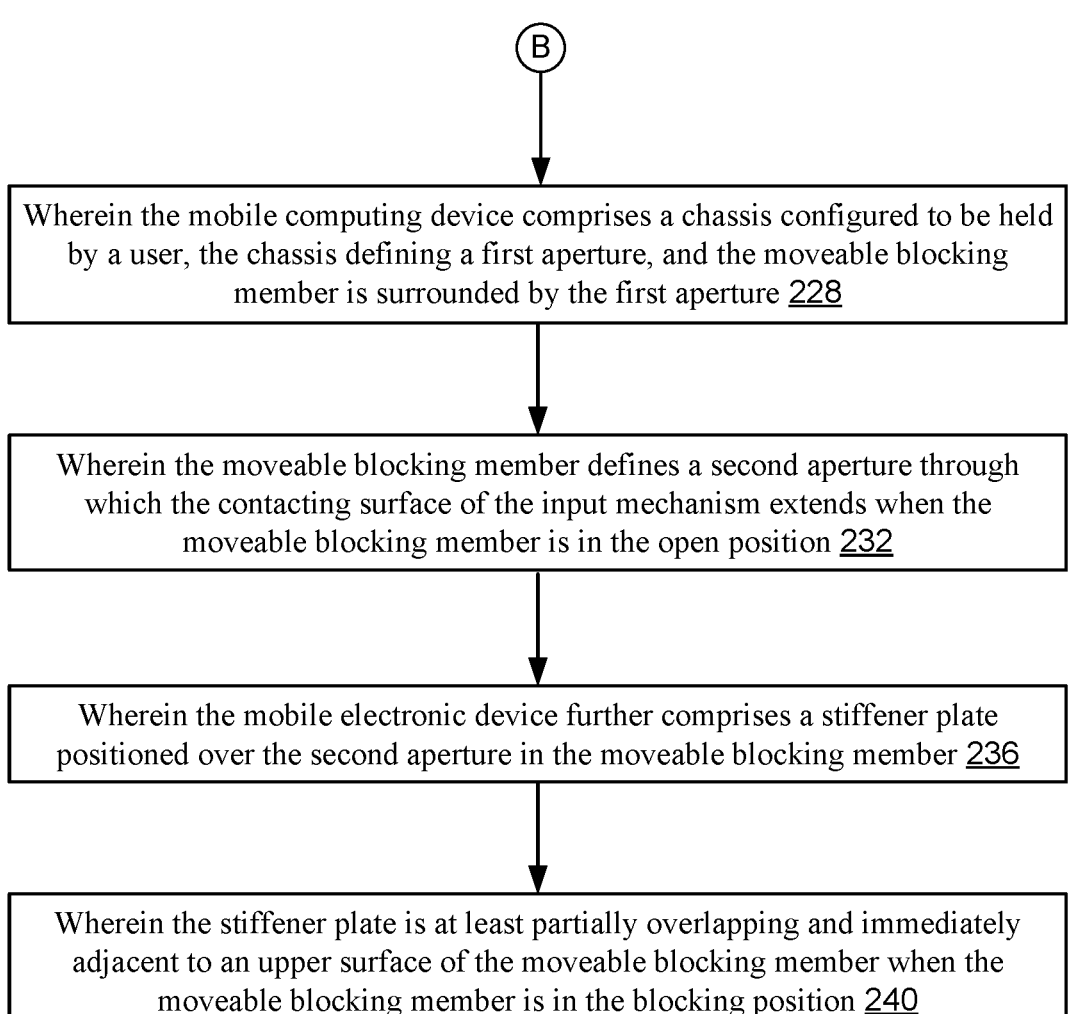

With reference now to FIGS. 10A and 10B, a method 200 for preventing and allowing actuation of an input mechanism in a mobile electronic device will now be described. FIGS. 10A-10B depict a flowchart illustrating method 200. In some examples, method 200 may be implemented and performed by mobile electronic device 100 as described above. In other examples, method 200 may be implemented and performed using other mobile electronic devices.

The following description of method 200 is provided by way of example and is not meant to be limiting. Therefore, it is to be understood that method 200 may include additional and/or alternative steps relative to those illustrated in FIGS. 10A-10B. Further, it is to be understood that the steps of method 200 may be performed in any suitable order. Further still, it is to be understood that one or more steps may be omitted from method 200 without departing from the scope of this disclosure. It will also be appreciated that method 200 also may be performed in other contexts using other suitable components.

With reference to FIG. 10A, in one example the method 200 is performed with a mobile electronic device comprising a sensor and moveable blocking member at least partially surrounding an input mechanism. At 204 the method 200 includes using signals at least from the sensor to determine that a user's hand is not proximate to the mobile electronic device. At 208 the method 200 includes, based at least on determining that the user's hand is not proximate to the mobile electronic device, moving the moveable blocking member to a blocking position that prevents actuation of the input mechanism. At 212 the method 200 includes, using signals at least from the sensor to determine that a user's hand is proximate to the mobile electronic device. At 216 the method 200 includes, based at least on determining that the user's hand is proximate to the mobile electronic device, moving the moveable blocking member to an open position that allows actuation of the input mechanism.

At 220 the method 200 includes, wherein the input mechanism comprises a contacting surface configured to be depressed to actuate the input mechanism, wherein moving the moveable blocking member to the blocking position comprises moving the moveable blocking member to locate at least a portion of an upper surface of the moveable blocking member above the contacting surface of the input mechanism. At 224 the method 200 includes, wherein moving the moveable blocking member to the open position comprises moving the moveable blocking member to locate the upper surface of the moveable blocking member below the contacting surface of the input mechanism.

With reference now to FIG. 10B, at 228 the method 200 includes wherein the mobile electronic device comprises a chassis configured to be held by a user, the chassis defining a first aperture, and the moveable blocking member is surrounded by the first aperture. At 232 method 200 includes, wherein the moveable blocking member defines a second aperture through which the contacting surface of the input mechanism extends when the moveable blocking member is in the open position. At 236 the method 200 includes, wherein the mobile electronic device further comprises a stiffener plate positioned over the second aperture in the moveable blocking member. At 240 the method 200 includes, wherein the stiffener plate is at least partially overlapping and immediately adjacent to an upper surface of the moveable blocking member when the moveable blocking member is in the blocking position.

In some embodiments, one or more aspects of the methods and processes described herein may be tied to a computing system of one or more computing devices. In particular, such methods and processes may be implemented as a computer-application program or service, an application-programming interface (API), a library, and/or other computer-program product.

Figure 11:
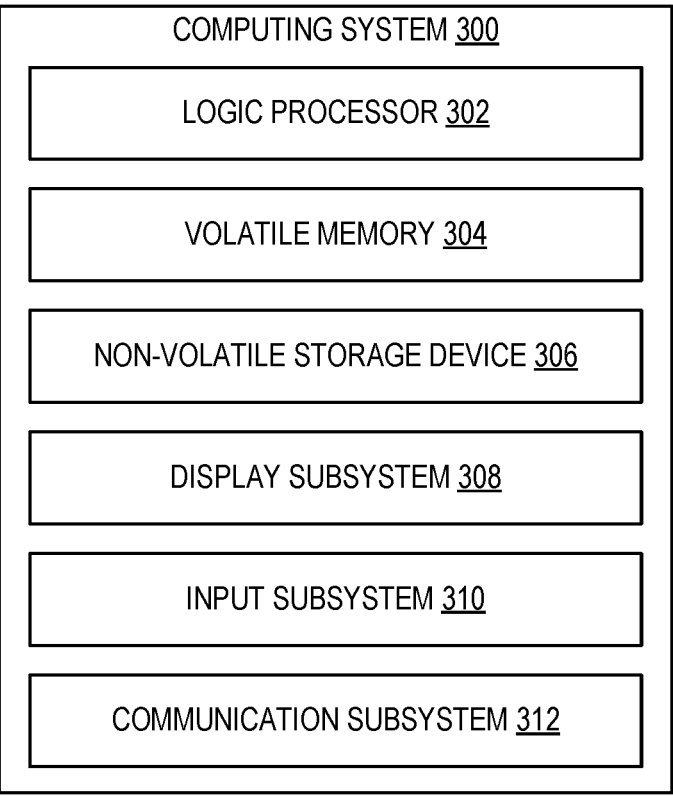
FIG. 11 schematically depicts an example computing system.

FIG. 11 schematically shows a non-limiting embodiment of a computing system 300 that can enact one or more of the methods and processes described above. Computing system 300 is shown in simplified form. The mobile electronic device 100 described herein may utilize the computing system 300 or one or more aspects of the computing system.

Computing system 300 includes a logic processor 302, volatile memory 304, and a non-volatile storage device 306. Computing system 300 may optionally include a display subsystem 308, input subsystem 310, communication subsystem 312, and/or other components not shown in FIG. 11.

Logic processor 302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built-in. Non-volatile storage device 306 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 304 may include physical devices that include random access memory. Volatile memory 304 is typically utilized by logic processor 302 to temporarily store information during processing of software instructions. It will be appreciated that volatile memory 304 typically does not continue to store instructions when power is cut to the volatile memory 304.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 typically implemented in software by a processor to perform a particular function using portions of volatile memory, which function involves transformative processing that specially configures the processor to perform the function. Thus, a module, program, or engine may be instantiated via logic processor 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 308 may be used to present a visual representation of data held by non-volatile storage device 306. As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology.

When included, input subsystem 310 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wireless telephone network, or a wired or wireless personal-, local-, or wide-area network, such as Bluetooth or an HDMI over Wi-Fi connection. In some embodiments, the communication subsystem may allow computing system 300 to send and/or receive messages to and/or from other devices via a network such as the Internet.

The following paragraphs provide additional support for the claims of the subject application. One aspect provides a mobile electronic device, comprising: a chassis configured to be held by a user; a moveable blocking member associated with the chassis and at least partially surrounding an input mechanism; an actuator coupled to the moveable blocking member; a cover affixed to the chassis and extending over the moveable blocking member; an input component between the cover and the moveable blocking member; a sensor configured to detect at least a user's hand proximate to the cover; a processor; and a memory storing instructions executable by the processor to: use signals at least from the sensor to determine that a user's hand is proximate to the cover; and based at least on determining that the user's hand is proximate to the cover, activating the actuator to move the moveable blocking member from a blocking position that prevents movement of the input component to an open position that allows movement of the input component and actuation of the input mechanism. The computing device may additionally or alternatively include, wherein the input mechanism comprises a contacting surface configured to be depressed to actuate the input mechanism, and when the moveable blocking member is in the blocking position, at least a portion of an upper surface of the moveable blocking member is located above the contacting surface of the input mechanism. The computing device may additionally or alternatively include, wherein when the moveable blocking member is in the open position, the upper surface of the moveable blocking member is located below the contacting surface of the input mechanism. The computing device may additionally or alternatively include, wherein the chassis defines a first aperture and at least a portion of the moveable blocking member is surrounded by the first aperture. The computing device may additionally or alternatively include, wherein the moveable blocking member defines a second aperture through which the contacting surface of the input mechanism extends when the moveable blocking member is in the open position. The computing device may additionally or alternatively include, wherein the input component comprises a stiffener plate positioned over the second aperture in the moveable blocking member. The computing device may additionally or alternatively include, wherein stiffener plate is at least partially overlapping and immediately adjacent to an upper surface of the moveable blocking member when the moveable blocking member is in the blocking position. The computing device may additionally or alternatively include, wherein the stiffener plate is affixed to an interior surface of the cover. The computing device may additionally or alternatively include, wherein the sensor comprises a capacitive touch sensor. The computing device may additionally or alternatively include, wherein the cover comprises the sensor. The computing device may additionally or alternatively include, wherein the cover comprises a flexible material. The computing device may additionally or alternatively include, wherein the instructions are executable to: use signals at least from the sensor to determine that the user's hand is not proximate to the cover; and based at least on determining that the user's hand is not proximate to the cover, activating the actuator to move the moveable blocking member to the blocking position that prevents movement of the input component.

Another aspect provides a method for preventing and allowing actuation of an input mechanism in a mobile electronic device, the mobile electronic device comprising a sensor and a moveable blocking member at least partially surrounding the input mechanism, the method comprising: using signals at least from the sensor to determine that a user's hand is not proximate to the mobile electronic device; based at least on determining that the user's hand is not proximate to the mobile electronic device, moving the moveable blocking member to a blocking position that prevents actuation of the input mechanism; using signals at least from the sensor to determine that a user's hand is proximate to the mobile electronic device; and based at least on determining that the user's hand is proximate to the mobile electronic device, moving the moveable blocking member to an open position that allows actuation of the input mechanism. The method may additionally or alternatively include, wherein the input mechanism comprises a contacting surface configured to be depressed to actuate the input mechanism, wherein moving the moveable blocking member to the blocking position comprises moving the moveable blocking member to locate at least a portion of an upper surface of the moveable blocking member above the contacting surface of the input mechanism. The method may additionally or alternatively include, wherein moving the moveable blocking member to the open position comprises moving the moveable blocking member to locate the upper surface of the moveable blocking member below the contacting surface of the input mechanism. The method may additionally or alternatively include, wherein the mobile electronic device comprises a chassis configured to be held by a user, the chassis defining a first aperture, and the moveable blocking member is surrounded by the first aperture. The method may additionally or alternatively include, wherein the moveable blocking member defines a second aperture through which the contacting surface of the input mechanism extends when the moveable blocking member is in the open position. The method may additionally or alternatively include, wherein the mobile electronic device comprises a stiffener plate positioned over the second aperture in the moveable blocking member. The method may additionally or alternatively include, wherein the stiffener plate is at least partially overlapping and immediately adjacent to an upper surface of the moveable blocking member when the moveable blocking member is in the blocking position.

Another aspect provides a mobile electronic device, comprising: a chassis configured to be held by a user and defining a first aperture; a moveable blocking member located at least partially within the first aperture and at least partially surrounding an input mechanism, the input mechanism comprising a contacting surface configured to be depressed to actuate the input mechanism, the moveable blocking member defining a second aperture through which the contacting surface of the input mechanism extends when the moveable blocking member is in an open position; an actuator coupled to the moveable blocking member; a stiffener plate positioned over the second aperture in the moveable blocking member, the stiffener plate at least partially overlapping and immediately adjacent to_an upper surface of the moveable blocking member when the moveable blocking member is in a blocking position that prevents movement of the stiffener plate towards the input mechanism; a cover affixed to the chassis and extending over the stiffener plate and the moveable blocking member; a sensor configured to detect at least a user's hand proximate to the cover; a processor; and a memory storing instructions executable by the processor to: use signals at least from the sensor to determine that the user's hand is proximate to the cover; and based at least on determining that the user's hand is proximate to the cover, activating the actuator to move the moveable blocking member from the blocking position to the open position that allows the stiffener plate to move towards and contact the contacting surface of the input mechanism.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed. Additionally, usage of the term "when" does not create or require any particular timing between the corresponding actions or conditions.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A mobile electronic device, comprising:
a chassis configured to be held by a user;
a moveable blocking member associated with the chassis and at least partially surrounding an input mechanism;
an actuator coupled to the moveable blocking member;
a cover affixed to the chassis and extending over the moveable blocking member;
an input component between the cover and the moveable blocking member;
a sensor configured to detect at least a user's hand proximate to the cover;
a processor; and
a memory storing instructions executable by the processor to:
use signals at least from the sensor to determine that a user's hand is proximate to the cover; and
based at least on determining that the user's hand is proximate to the cover, activating the actuator to move the moveable blocking member from a blocking position that prevents movement of the input component to an open position that allows movement of the input component and actuation of the input mechanism.

2. The mobile electronic device of claim 1, wherein the input mechanism comprises a contacting surface configured to be depressed to actuate the input mechanism, and when the moveable blocking member is in the blocking position, at least a portion of an upper surface of the moveable blocking member is located above the contacting surface of the input mechanism.

3. The mobile electronic device of claim 2, wherein when the moveable blocking member is in the open position, the upper surface of the moveable blocking member is located below the contacting surface of the input mechanism.

4. The mobile electronic device of claim 1, wherein the chassis defines a first aperture and at least a portion of the moveable blocking member is surrounded by the first aperture.

5. The mobile electronic device of claim 4, wherein the moveable blocking member defines a second aperture through which the contacting surface of the input mechanism extends when the moveable blocking member is in the open position.

6. The mobile electronic device of claim 5, wherein the input component comprises a stiffener plate positioned over the second aperture in the moveable blocking member.

7. The mobile electronic device of claim 6, wherein stiffener plate is at least partially overlapping and immediately adjacent to an upper surface of the moveable blocking member when the moveable blocking member is in the blocking position.

8. The mobile electronic device of claim 7, wherein the stiffener plate is affixed to an interior surface of the cover.

9. The mobile electronic device of claim 1, wherein the sensor comprises a capacitive touch sensor.

10. The mobile electronic device of claim 1, wherein the cover comprises the sensor.

11. The mobile electronic device of claim 1, wherein the cover comprises a flexible material.

12. The mobile electronic device of claim 1, wherein the instructions are executable to:
use signals at least from the sensor to determine that the user's hand is not proximate to the cover; and
based at least on determining that the user's hand is not proximate to the cover, activating the actuator to move the moveable blocking member to the blocking position that prevents movement of the input component.

13. A method for preventing and allowing actuation of an input mechanism in a mobile electronic device, the mobile electronic device comprising a sensor and a moveable blocking member at least partially surrounding the input mechanism, the method comprising:

using signals at least from the sensor to determine that a user's hand is not proximate to the mobile electronic device;

based at least on determining that the user's hand is not proximate to the mobile electronic device, moving the moveable blocking member to a blocking position that prevents actuation of the input mechanism;

using signals at least from the sensor to determine that a user's hand is proximate to the mobile electronic device; and based at least on determining that the user's hand is proximate to the mobile electronic device, moving the moveable blocking member to an open position that allows actuation of the input mechanism.

14. The method of claim 13, wherein the input mechanism comprises a contacting surface configured to be depressed to actuate the input mechanism, wherein moving the moveable blocking member to the blocking position comprises moving the moveable blocking member to locate at least a portion of an upper surface of the moveable blocking member above the contacting surface of the input mechanism.

15. The method of claim 14, wherein moving the moveable blocking member to the open position comprises moving the moveable blocking member to locate the upper surface of the moveable blocking member below the contacting surface of the input mechanism.

16. The method of claim 13, wherein the mobile electronic device comprises a chassis configured to be held by a user, the chassis defining a first aperture, and the moveable blocking member is surrounded by the first aperture.

17. The method of claim 16, wherein the moveable blocking member defines a second aperture through which the contacting surface of the input mechanism extends when the moveable blocking member is in the open position.

18. The method of claim 17, wherein the mobile electronic device comprises a stiffener plate positioned over the second aperture in the moveable blocking member.

19. The method of claim 18, wherein the stiffener plate is at least partially overlapping and immediately adjacent to an upper surface of the moveable blocking member when the moveable blocking member is in the blocking position.

20. A mobile electronic device, comprising:

a chassis configured to be held by a user and defining a first aperture;

a moveable blocking member located at least partially within the first aperture and at least partially surrounding an input mechanism, the input mechanism comprising a contacting surface configured to be depressed to actuate the input mechanism, the moveable blocking member defining a second aperture through which the contacting surface of the input mechanism extends when the moveable blocking member is in an open position;

an actuator coupled to the moveable blocking member;

a stiffener plate positioned over the second aperture in the moveable blocking member, the stiffener plate at least partially overlapping and immediately adjacent to an upper surface of the moveable blocking member when the moveable blocking member is in a blocking position that prevents movement of the stiffener plate towards the input mechanism;

a cover affixed to the chassis and extending over the stiffener plate and the moveable blocking member;

a sensor configured to detect at least a user's hand proximate to the cover;

a processor; and a memory storing instructions executable by the processor to:

use signals at least from the sensor to determine that the user's hand is proximate to the cover; and based at least on determining that the user's hand is proximate to the cover, activating the actuator to move the moveable blocking member from the blocking position to the open position that allows the stiffener plate to move towards and contact the contacting surface of the input mechanism.

* * * * *